(12) United States Patent
Saez et al.

(10) Patent No.: US 8,897,966 B2
(45) Date of Patent: Nov. 25, 2014

(54) METHODS AND APPARATUS FOR VARIABLE REDUCED EFFORT STEERING IN ELECTRIC STEERING SYSTEMS

(76) Inventors: Carlos A. Saez, Houston, TX (US); Alejandro Javier Goldsmith Llorenz, Houston, TX (US); Neil Emerson Rollano Conde, Buin (CL)

( * ) Notice: Subject to any disclaimer, the term of this patent is extended or adjusted under 35 U.S.C. 154(b) by 256 days.

(21) Appl. No.: 13/470,161

(22) Filed: May 11, 2012

(65) Prior Publication Data

US 2012/0290172 A1    Nov. 15, 2012

Related U.S. Application Data

(60) Provisional application No. 61/485,516, filed on May 12, 2011.

(51) Int. Cl.
    *B62D 5/04*         (2006.01)

(52) U.S. Cl.
    CPC ............... *B62D 5/0463* (2013.01); *B62D 5/04* (2013.01)
    USPC ........ 701/43; 701/1; 701/44; 701/54; 701/70; 701/80; 180/402; 180/421; 180/443; 180/444; 180/446; 318/448; 318/489; 318/640

(58) Field of Classification Search
    CPC ........... B62D 6/10; B62D 5/49; B62D 6/008; B62D 5/006; B62D 5/04; B62D 5/0463
    USPC .......... 701/1, 43, 44, 54, 70, 80, 91; 180/402, 180/421, 443, 444, 446; 318/448, 489, 640
See application file for complete search history.

(56) References Cited

U.S. PATENT DOCUMENTS

| | | | |
|---|---|---|---|
| 3,980,999 | A | 9/1976 | Nishioka et al. |
| 4,077,138 | A | 3/1978 | Foerst |
| 4,834,201 | A | 5/1989 | Miyazaki et al. |
| 4,873,475 | A | 10/1989 | Togo et al. |
| 5,078,421 | A | 1/1992 | Kokubo et al. |
| 5,103,232 | A | 4/1992 | Chang et al. |

(Continued)

FOREIGN PATENT DOCUMENTS

| | | |
|---|---|---|
| EP | 0395310 A1 | 10/1990 |
| EP | 0395310 B1 | 10/1990 |

(Continued)

OTHER PUBLICATIONS

International Search Report dated Nov. 29, 2012 for PCT/US2012/037616 (IDS/0002 PC).

*Primary Examiner* — John R Olszewski
*Assistant Examiner* — Truc M Do

(57) ABSTRACT

Embodiments of the invention provide methods and apparatus for reducing steering effort in a vehicle. In one embodiment, a method for installing a steering-assist system onto a vehicle having an electrically powered steering system is provided. The method includes placing a controller between a torque sensor and an electronic control unit (ECU) disposed on the vehicle, coupling a primary signal line from the torque sensor to be in electrical communication with the controller, and coupling a secondary signal line to the controller to be in electrical communication with the ECU, wherein, when movement is detected by the torque sensor, the torque sensor provides a primary signal to the controller and the controller provides a secondary signal to the ECU, the secondary signal being different than the primary signal.

18 Claims, 6 Drawing Sheets

(56) References Cited

U.S. PATENT DOCUMENTS

| | | | |
|---|---|---|---|
| 5,136,650 A | 8/1992 | Griesinger | |
| 5,253,725 A * | 10/1993 | Nishimoto | 180/446 |
| 5,321,628 A | 6/1994 | Beebe | |
| 5,635,807 A | 6/1997 | Lautzenhiser | |
| 5,927,429 A | 7/1999 | Sugino et al. | |
| 5,967,253 A | 10/1999 | Collier-Hallman | |
| 6,032,091 A | 2/2000 | Noro et al. | |
| 6,212,453 B1 | 4/2001 | Kawagoe et al. | |
| 6,295,493 B1 | 9/2001 | Kawazoe | |
| 6,338,015 B1 * | 1/2002 | Kawagoe et al. | 701/41 |
| 6,408,235 B1 | 6/2002 | Tanke, II et al. | |
| 6,470,250 B2 | 10/2002 | Nishizaki et al. | |
| 6,647,328 B2 | 11/2003 | Walker | |
| 6,779,626 B2 * | 8/2004 | Matsuoka et al. | 180/446 |
| 6,892,120 B2 * | 5/2005 | Kanda | 701/41 |
| 7,092,805 B2 | 8/2006 | Kasahara et al. | |
| 7,202,621 B2 * | 4/2007 | Tsunoda | 318/434 |
| 7,204,732 B2 | 4/2007 | Mizuguchi | |
| 7,213,669 B2 | 5/2007 | Fecteau et al. | |
| 7,444,217 B2 | 10/2008 | Matsuoka | |
| 7,721,841 B2 | 5/2010 | Shibata | |
| 7,726,797 B2 | 6/2010 | Jones et al. | |
| 7,743,874 B2 | 6/2010 | Yasui et al. | |
| 7,833,163 B2 | 11/2010 | Cai | |
| 7,913,804 B2 | 3/2011 | Ehara et al. | |
| 7,938,026 B2 * | 5/2011 | Oniwa et al. | 73/862.333 |
| 7,970,513 B2 | 6/2011 | Yasui et al. | |
| 8,073,592 B2 * | 12/2011 | Nishimori et al. | 701/39 |
| 8,155,840 B2 * | 4/2012 | Kim | 701/42 |
| 8,179,079 B2 * | 5/2012 | Mukai et al. | 318/661 |
| 8,660,743 B2 * | 2/2014 | Aoki | 701/34.4 |
| 2001/0047900 A1 | 12/2001 | Fecteau et al. | |
| 2001/0056317 A1 | 12/2001 | Nishizaki et al. | |
| 2001/0056544 A1 | 12/2001 | Walker | |
| 2002/0128785 A1 * | 9/2002 | Van Reenen | 702/65 |
| 2003/0178241 A1 * | 9/2003 | Yokota et al. | 180/441 |
| 2003/0201129 A2 | 10/2003 | Fecteau et al. | |
| 2004/0049324 A1 | 3/2004 | Walker | |
| 2004/0238257 A1 * | 12/2004 | Takahashi et al. | 180/402 |
| 2005/0039971 A1 * | 2/2005 | Fujioka et al. | 180/402 |
| 2005/0080532 A1 * | 4/2005 | Kato et al. | 701/41 |
| 2005/0131298 A1 | 6/2005 | Cai | |
| 2005/0149241 A1 * | 7/2005 | Fujioka et al. | 701/41 |
| 2005/0162292 A1 * | 7/2005 | Kanekawa et al. | 341/111 |
| 2005/0173182 A1 * | 8/2005 | Yokota et al. | 180/441 |
| 2005/0205344 A1 * | 9/2005 | Uryu | 180/446 |
| 2005/0230180 A1 * | 10/2005 | Kodama | 180/446 |
| 2006/0040572 A1 | 2/2006 | Mizuguchi | |
| 2007/0107977 A1 | 5/2007 | Shibata | |
| 2007/0261904 A1 | 11/2007 | Fecteau et al. | |
| 2007/0289808 A1 | 12/2007 | Yasui et al. | |
| 2007/0294008 A1 | 12/2007 | Yasui et al. | |
| 2008/0091309 A1 | 4/2008 | Walker | |
| 2008/0122908 A1 | 5/2008 | Jones et al. | |
| 2008/0139124 A1 | 6/2008 | Tillotson | |
| 2008/0197743 A1 | 8/2008 | Matsubara | |
| 2008/0243339 A1 * | 10/2008 | Nishimori et al. | 701/41 |
| 2008/0277192 A1 | 11/2008 | Nishimura | |
| 2008/0281491 A1 | 11/2008 | Yasui et al. | |
| 2009/0000857 A1 | 1/2009 | Sugiyama et al. | |
| 2010/0211263 A1 | 8/2010 | Lindenstruth | |
| 2010/0332083 A1 | 12/2010 | Yanagi et al. | |
| 2011/0036660 A1 * | 2/2011 | Kojo et al. | 180/446 |
| 2011/0224876 A1 * | 9/2011 | Paholics et al. | 701/42 |

FOREIGN PATENT DOCUMENTS

| | | |
|---|---|---|
| EP | 0765795 A2 | 4/1997 |
| EP | 913316 A2 | 5/1999 |
| EP | 0926045 A2 | 6/1999 |
| EP | 913316 A3 | 3/2001 |
| EP | 0926045 A3 | 5/2001 |
| EP | 1768226 | 3/2007 |
| WO | WO-/93/07460 A1 | 4/1993 |

* cited by examiner

METHODS AND APPARATUS FOR VARIABLE REDUCED EFFORT STEERING IN ELECTRIC STEERING SYSTEMS

CROSS-REFERENCE TO RELATED APPLICATIONS

This application claims benefit of U.S. Provisional Patent Application Ser. No. 61/485,516, filed May 12, 2011, which application is hereby incorporated by reference herein.

BACKGROUND OF THE INVENTION

1. Field of the Invention

The present invention relates to methods and apparatus for controlling electrically powered steering systems in motor vehicles. More particularly, embodiments described herein are directed to controlling and/or adjusting a torque value involved in steering a vehicle equipped with electrically powered steering.

2. Description of the Related Art

Conventional motor vehicles typically include a steering system having a steering wheel that controls one or more ground wheels in order to control the direction of travel of the vehicle. Rotation of the steering wheel by a driver causes the one or more ground wheels to turn or realign, which, when the vehicle is in motion, causes the vehicle to change direction. These vehicles typically include some form of power-assist system which reduces the torque required to rotate the steering wheel while providing the mechanical force required to turn the one or more ground wheels. The power-assist systems include hydraulic systems and more recently, electrically powered systems, commonly referred to as electric power steering (EPS) systems.

These systems facilitate a reduction in the torque value required to rotate the steering wheel. Conventional hydraulic steering systems require about 25-30 foot·pounds (ft·lbs) of torque to rotate the steering wheel. EPS systems may be slightly more or less, depending on the type of vehicle and the factory torque value setting provided by the original equipment manufacturer (OEM). EPS systems also typically include steering effort adjustments based solely on the speed of travel of the vehicle.

While the EPS systems significantly lower the effort involved in steering the vehicle, the torque level used to turn the steering wheel is not low enough for all drivers. For example, individuals with a spinal cord injury or other debilitating disability, as well as some elderly individuals, may not have the physical strength to rotate the steering wheel at these conventional levels. These individuals often need additional reduced effort steering that is less than the OEM torque levels deliver in order to safely operate the vehicle.

Various methods for reducing steering effort in hydraulic systems are available. However, EPS systems are not easily modified due to the presence of electronic components on vehicles equipped with EPS systems, such as an electronic control unit (ECU), a controller area network (CAN), and the like, which typically perform diagnostics on the vehicle systems, including the EPS system. Thus, modification of EPS systems to reduce steering effort may cause the EPS system to malfunction and/or shut down.

Therefore, a need exists for methods and apparatus for modifying an EPS system to adjust the steering effort to a desired torque value that provides enhanced low effort steering of the vehicle.

SUMMARY OF THE INVENTION

Embodiments described herein are directed to methods and apparatus for controlling and/or adjusting a torque value involved in rotating a vehicle steering wheel. More specifically, embodiments of the invention provide methods and apparatus for reducing steering effort in a vehicle to values that provide enhanced steering assistance than is available in commercially available vehicles.

In one embodiment, a method for installing a steering-assist system onto a vehicle having an electrically powered steering system is provided. The method includes placing a controller between a torque sensor and an electronic control unit (ECU) disposed on the vehicle, coupling a primary signal line from the torque sensor to be in electrical communication with the controller, and coupling a secondary signal line to the controller to be in electrical communication with the ECU, wherein, when movement is detected by the torque sensor, the torque sensor provides a primary signal to the controller and the controller provides a secondary signal to the ECU, the secondary signal being different than the primary signal.

In another embodiment, a method for installing a steering-assist system onto a vehicle having an electrically powered steering system is provided. The method includes placing a controller intermediate of a torque sensor and an electronic control unit (ECU) disposed on the vehicle, coupling a first primary signal line and a second primary signal line from the torque sensor to be in electrical communication with the controller, and coupling a first secondary signal line and a second secondary signal line to the controller to be in electrical communication with the ECU, wherein, when movement is detected by the torque sensor, the torque sensor provides a primary signal from the first primary signal line and the second primary signal line to the controller and the controller provides a secondary signal to the ECU through the first secondary signal line and the second secondary signal line, the first secondary signal being different than the first primary signal.

In another embodiment, a steering-assist system for use in a vehicle having an electrically powered steering system is provided. The steering-assist system includes a controller adapted to be coupled intermediate of a torque sensor and an electronic control unit (ECU) disposed on a vehicle, a first primary signal line and a second primary signal line adapted to be coupled between the torque sensor and the controller, and a first secondary signal line and a second secondary signal line adapted to be coupled to the controller and the ECU, wherein, a primary signal from the first primary signal line and the second primary signal line is provided to the controller from the torque sensor and a secondary signal is provided to the ECU from the first secondary signal line and the second secondary signal line from the controller upon movement detected by the torque sensor, the first secondary signal being different than the first primary signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the invention provide methods and apparatus for reducing steering effort in a vehicle. The methods and apparatus as provided herein may be utilized to control and/or adjust a steering assistance value set by an original equipment manufacturer (OEM) of the vehicle to a steering assistance value that is less than the OEM steering assistance value. In one aspect, the invention provides a method and apparatus for a steering-assist system that is retrofitted into an OEM vehicle having an existing electric power steering (EPS) system. The steering-assist system may be utilized to reduce and/or adjust the steering assistance of the OEM vehicle to values that are not available with the OEM EPS system. The steering-assist module may be utilized in conjunction with the existing EPS system while retaining OEM assisted steering at different operational speeds.

Figure 1:
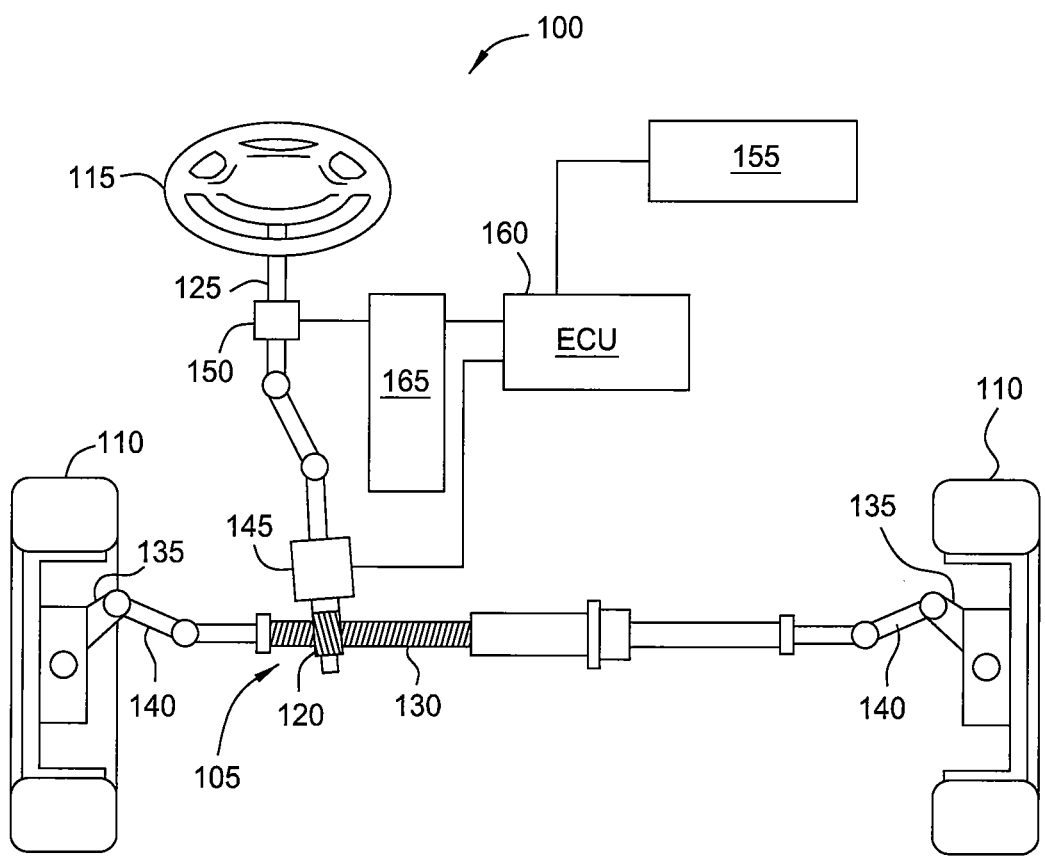
FIG. 1 is a schematic representation of a portion of a vehicle with an electric power steering (EPS) system according to an embodiment of the invention.

FIG. 1 is a schematic representation of a portion of a vehicle 100 with an electric power steering (EPS) system embodying the present invention. The vehicle 100 includes a steering control system 105 coupled between ground wheels 110 and a steering wheel 115. The steering control system 105 may comprise numerous linking members and a gear system but in this example comprises a rack and pinion mechanism. The steering control system 105 includes a pinion gear 120 integrally connected to the steering wheel 115 by a column 125. The steering control system 105 also includes a rack shaft 130 that meshes with the pinion gear 120. Opposing ends of the rack shaft 130 are connected to knuckle arms 135 of the right and left ground wheels 110 by corresponding tie rods 140 so that the direction of the ground wheels 110 may be controlled according to the angular movement of the steering wheel 115. Additionally, the rack shaft 130 is connected to a motor 145 that is part of the steering control system 105 to provide a motive force to the steering linkage 105 that assists in rotating the pinion gear 120. The steering control system 105 may also include a reduction gear (not shown) that may be coupled to the motor 145 to provide a reduction in the amount of torque needed to rotate the steering wheel 115 when controlling the direction of the ground wheels 110.

The steering control system 105 also includes a torque sensor 150 for detecting a manual steering torque acting upon the column 125. The steering control system 105 may also include a steering angle sensor (not shown) coupled to the column 125 or incorporated with the torque sensor 150. A vehicle speed sensor 155 for detecting a speed of the vehicle 100 is mounted on a suitable part of the vehicle body. The vehicle speed sensor 155 is coupled to an OEM electronic control unit (ECU), which is incorporated with a microcomputer, as well as various circuits, networks and interfaces that monitor conditions of the vehicle 100 and control variables of operation of systems of the vehicle 100 based on those conditions. Other sensors, such as temperature sensors, a tachometer, a thermometer, and various other monitoring devices may also be in communication with the ECU. One of the systems controlled by the ECU includes the steering control system 105.

The output signals of the torque sensor 150 are typically provided directly to a steering control module 160 that is part of the ECU. The ECU may provide a varied signal (i.e., voltage, current, etc.) to the motor 145 to vary the effort required to rotate the steering wheel 115 at certain operational speeds of the vehicle. For example, signals from the torque sensor 150 and the vehicle speed sensor 155 may be provided to the steering control module 160 which controls the output to the motor 145. The rotational velocity of the motor 145 may be controlled by pulse width modulation (PWM) and/or variable frequency (VF). The output of the steering control module 160 may vary the frequency and time the motor 145 receives the signals to adjust the rotational velocity of the motor 145 and the motive force acting on the steering control system 105. When torque is detected by the torque sensor 150, the steering control module 160 may provide a different signal (i.e., different frequency, etc.) based on the vehicle speed information which would vary the motive force to the steering control system 105 based on the operational speed of the vehicle. At high speeds, such as greater than about 35 miles per hour (mph), the signal may be controlled by the steering control module 160 to provide reduced motive force to the motor 145 which results in minimal assistance to the steering control system 105. However, at lower speeds, the signal may be controlled by the steering control module 160 to provide a greater level of motive force to the motor 145 which results in greater assistance to the steering control system 105 and a reduction in effort for rotation of the steering wheel 115 at these lower operational speeds.

The vehicle 100 also includes a steering-assist system 165 coupled between the torque sensor 150 and the ECU. The steering-assist system 165 is utilized to receive signals from portions of the steering control system 105 and facilitates the sending of modified control signals to portions of the steering control system 105, such as the motor 145, through the ECU. In one embodiment, the steering-assist system 165 is used in conjunction with the steering control module 160 of the ECU to modify the existing ECU steering signal values outputted to the motor 145. When utilized with the ECU, the steering-assist system 165 may be used to receive signals from portions of the steering control system 105 and modify those signals that are subsequently provided to the ECU, which facilitates modified signals from the ECU to the motor 145.

In one embodiment, the steering-assist system 165 may be coupled between, at least, the torque sensor 150 and the ECU. The steering-assist system 165 is configured to receive electrical signals from the torque sensor 150 when movement is sensed and provide a modified torque value to the steering control module 160 of the ECU. The steering control module 160 then provides a signal to the motor 145 based on the modified torque value provided by the steering-assist system 165. The signal provided to the motor 145 provides a greater motive force to the steering control system 105 than would be available from the ECU without the modified torque values provided by the steering-assist system 165. This results in enhanced reduced effort at the steering wheel 115 which enables persons with physical disabilities to easily operate the vehicle 100. In one embodiment, the steering-assist system 165 may be utilized with vehicles modified for physically challenged drivers, where the steering-assist system 165 amplifies the existing OEM steering system protocols and allows the physically challenged driver to turn the steering wheel with minimal effort. This is utilized to provide a greater steering force to the ground wheels than would be available using the OEM system by itself.

Figure 2:
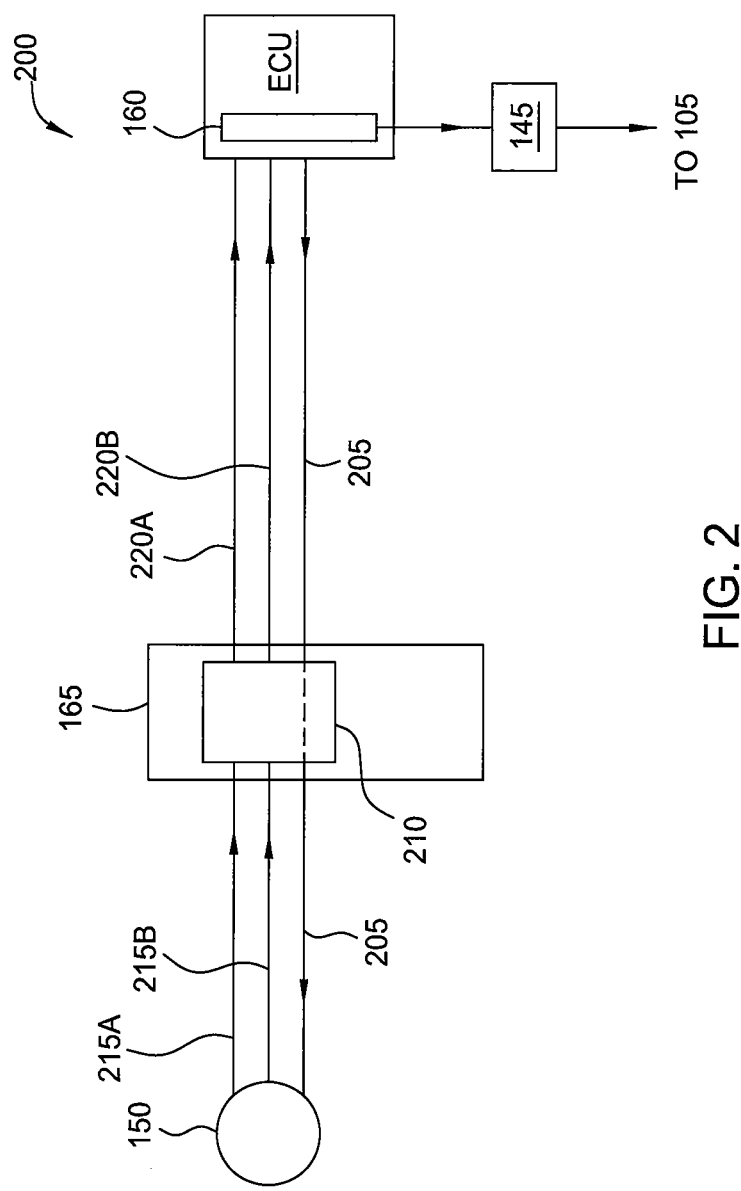
FIG. 2 is a schematic diagram of a dual steering-assist system according to an embodiment of the invention.

FIG. 2 is a schematic diagram of a dual steering-assist system 200 comprising the OEM ECU and the steering-assist system 165 of FIG. 1, as well as the motor 145 and the torque sensor 150. The steering-assist system 165 is coupled between the torque sensor 150 and the ECU. A first signal line 205 is coupled between the steering control module 160 and the torque sensor 150 to provide a reference signal to the torque sensor 150. The first signal line 205 may be coupled to be in electrical communication with a controller 210 disposed within the steering-assist system 165 where the reference signal may monitored. A first primary signal line 215A and a first secondary signal line 220A may be utilized to provide a master signal to the steering control module 160, and a second primary signal line 215B and a second secondary signal line 220B may be utilized to provide a slave signal to the steering control module 160. However, during installation of the steering-assist system 165 on a vehicle, the signal lines 215A, 220A, and the signal lines 215B, 220B are cut, spliced or otherwise provided to couple the torque sensor 150 and the steering control module 160 to be in electrical communication with the controller 210.

When rotation is sensed by the torque sensor 150, one or more signals are sent to the controller 210 of the steering-assist system 165. For example, a primary master signal may be provided to the controller 210 by the first primary signal line 215A, and a primary slave signal may be provided to the controller 210 by the second primary signal line 215B. The primary master signal and the primary slave signal may be related such that the difference between the signals is held substantially constant. For example, the primary master signal and the primary slave signal may be limited to a specific value, such as 5 Volts (V). At one point during operation, the primary master signal may be 2.5 V and the primary slave signal may be 2.5 V. At other times during operation, the primary master signal and the primary slave signal may be substantially inversely related. In one example, the primary master signal may be 3.0 V, 3.5 V or 4.0 V and the primary slave signal may be 2.0 V, 1.5 V, or 1.0 V, respectively. The relationship between the primary master signal and the primary slave signal is provided to verify that the torque sensor 150 is operating correctly.

The master and slave signals are monitored by the ECU and variations of the signals outside of predetermined values recognized by the ECU may register as a fault in the torque sensor 150, which may cause the ECU to shut down the portions of the steering control system 105. Within the steering-assist system 165, the controller 210 modifies (i.e., amplifies and/or conditions) the primary master signal and the primary slave signal to a secondary master signal and a secondary slave signal, respectively, which is provided to the steering control module 160 of the ECU by a first secondary signal line 220A and a second secondary signal line 220B, respectively.

The steering control module 160 of the ECU processes the secondary master signal and the secondary slave signal and verifies that the signals are within a range of allowable values. If the modified secondary master signal and the secondary slave signal are within the range of allowable values, the steering control module 160 determines that the torque sensor 150 is operating properly, and the steering control module 160 provides a signal to the motor 145 based on the modified secondary master signal, which provides additional motive force to the steering control system 105 than is available utilizing the ECU alone. The steering-assist system 165 thus facilitates a signal to the steering control module 160 of the ECU based on the modified signal(s) that is greater than the signal(s) that would otherwise be generated by the rotation of the steering wheel 115 (FIG. 1) without the steering control module 160. This facilitates a greater assistance to the steering control system 105 (via the motor 145) and provides an amplification of the actual torque value applied when turning the steering wheel 115.

In one example, the torque sensor 150 may detect a torque value of about 2 inch·pounds (in·lbs) and the steering control module 160 receives a torque value of about 10 in·lbs. In this example, the torque value that is received by the steering control module 160 represents about a 5:1 enhancement of the OEM torque value. Thus, a physically disabled and/or elderly driver is able to turn the steering wheel of the vehicle with less force applied to the steering wheel. While the example represents a 5:1 enhancement of steering assistance, in other embodiments, the enhancement may be about 2:1 to about 10:1, or greater, depending on the amount of torque signal amplification (i.e., gain) provided by the steering-assist system 165. Additionally, the steering assistance enhancement may be varied according to other factors, such as speed of the vehicle. For example, at low speeds, the steering assistance enhancement may be greater than the steering assistance enhancement at higher speeds.

Figure 3:
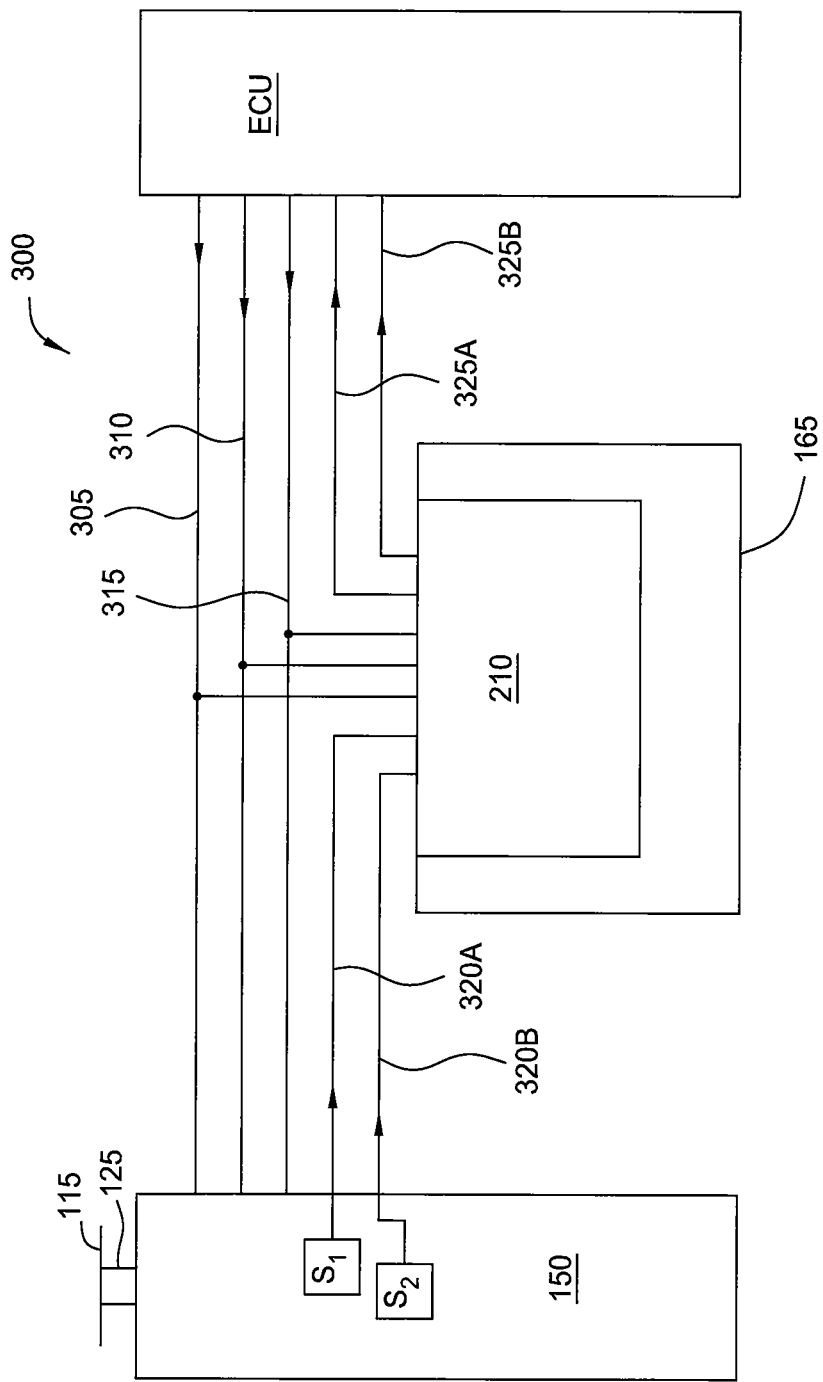
FIG. 3 is a schematic representation of a circuit according to embodiments of the invention.

FIG. 3 is a schematic representation of a circuit 300 including the torque sensor 150, the ECU and the controller 210 of the steering-assist system 165. The torque sensor 150, the ECU and the steering-assist system 165 are provided power via a first power signal 305 and a second power signal 310 which represents a positive (+) and negative (−) power supply line, respectively. In one example of operation, when the steering wheel 115 is rotated, the rotation is sensed by the torque sensor 150, and a primary master signal 320A from a first sensor $S_1$ of the torque sensor 150 is provided to the controller 210. The torque sensor 150 may also provide a primary slave signal 320B from a second sensor $S_2$ of the torque sensor 150 that is substantially the inverse of the primary master signal 320A. The primary slave signal 320B is utilized to verify the operation of the torque sensor 150. The controller 210 modifies the primary master signal 320A to a secondary master signal 325A that is different than the primary master signal 320A by a factor that is greater than 1, such as a factor of about 2 to about 99. The amount of modification may be stored in a memory within the controller 210 as a gain value that may be preset according to a steering assistance value necessary for a particular driver to safely operate the vehicle. The gain value may be modified to adjust the amount of modification to the master signal in order to change the amount of steering assistance necessary for a particular driver of the vehicle. The controller 210 may also modify the primary slave signal 320B to a secondary slave signal 325B that is substantially the inverse of the secondary master signal 325A and within values recognized by the ECU. As described above, the relationship between the primary master/slave signal may be limited to a specific value, which makes the signals substantially the inverse of the other during operation (i.e., when the steering wheel is turned), and the modified values of the secondary master/slave signal may follow the same protocol.

Figure 4:
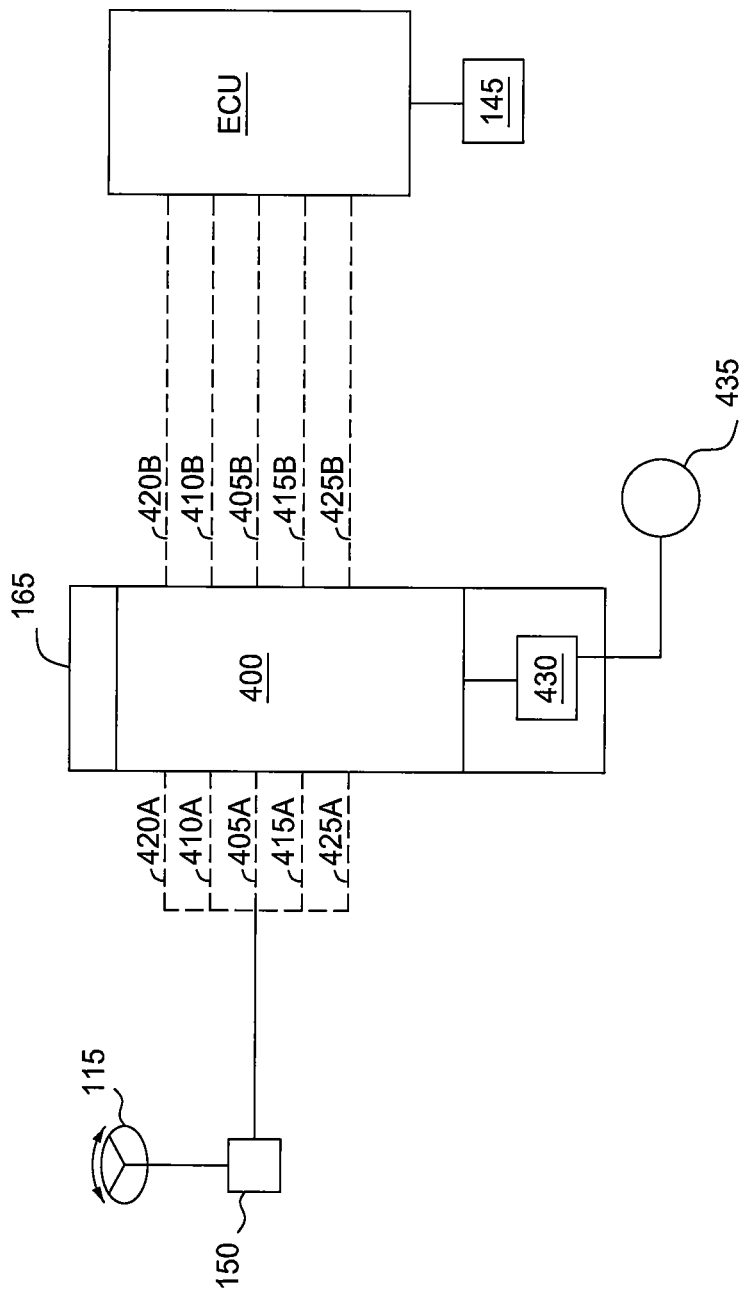
FIG. 4 is a schematic diagram showing one embodiment of a signal conversion module of the steering-assist system.

FIG. 4 is a schematic diagram showing one example of operation of a signal conversion module 400 of the steering-assist system 165 that is utilized to modify signals from the torque sensor 150 and provide the modified signals to the ECU. When no force is acting on the steering wheel 115, the torque sensor 150 provides a master signal 405A, which may represent an exemplary signal of 2.5 V and a torque of 0.0 in·lbs. The conversion module 400 of the steering-assist system 165 recognizes the signal and does not modify this signal as the steering wheel 115 is at rest, and a master signal 405B, representing an exemplary signal of 2.5 V and a torque of 0.0 in·lbs. is provided to the ECU. In turn, the ECU recognizes the 0.0 in·lbs and provides no additional power to the motor 145. When the steering wheel 115 is rotated, the torque sensor 150 provides a primary master signal 410A or 415A, depending on the direction of rotation of the steering wheel 115. In this example, the primary master signal 410A may represent a signal of 2.3 V and a torque of 2 in·lbs acting on the steering wheel 115 in a counterclockwise direction. Likewise, the primary master signal 415A may represent a signal of 2.7 V and a torque of 2 in·lbs acting on the steering wheel 115 in a clockwise direction. The conversion module 400 of the steering-assist system 165 may modify the primary master signals 410A, 415A to a modified secondary master signal 410B and a modified secondary master signal 415B, which represent 2.0V and 3.0V, respectively. Additionally, both of the modified secondary master signals 410B, 415B may represent a torque of about 10 in·lbs. The ECU uses the modified secondary master signals to apply the appropriate power to the motor 145 based on the representative torque values. In another example, when the steering wheel 115 is rotated, the torque sensor 150 provides a primary master signal 420A or 425A, representing a counterclockwise rotation and a clockwise rotation of the steering wheel 115, respectively. In this example, the primary master signal 420A may represent a signal of 2.0 V and a torque of 4 in·lbs acting on the steering wheel 115. Likewise, the primary master signal 425A may represent a signal of 3.0 V and a torque of 4 in·lbs acting on the steering wheel 115. The conversion module 400 of the steering-assist system 165 may modify the primary master signals 420A, 425A to a modified secondary master signal 420B and a modified secondary master signal 425B, which represent 1.2 V and 3.8 V, respectively. Additionally, both of the modified secondary master signals 420B, 325B may represent a torque of about 20 in·lbs. The ECU uses the modified secondary master signals to apply the appropriate power to the motor 145 based on the representative torque values. The primary master signals and modified secondary master signals used in the example above are only exemplary and the signal values, as well as the units may be different from vehicle to vehicle. For example, the signals may be greater than or less than the values used, and the unit may be current instead of voltage, depending on the make and model of the vehicle and the protocols involved for the torque sensor 150 and the ECU to operate. Additionally, the modification of the master signals representing the torque values may be more or less, depending on the desired gain that is preset or provided by a gain module 430 disposed on the steering-assist system 165. The gain module 430 may be coupled to an adjustment module 435, such as a potentiometer, that varies the gain and the modification of the primary signals to secondary signals. While the signal conversion module 400 is described in conjunction with modification of primary master signals, the steering-assist system 165 may include a second signal conversion module that modifies primary slave signals.

The signal value of the modified secondary master signals provided by the steering-assist system 165 may be determined according to a gain signal equation:

$$nU+(x-nU)\cdot G=\text{secondary signal},$$

where n is a primary master signal from the torque sensor 150 when the steering wheel 115 is at rest, U is a signal unit (Volts, amperes, etc.), x is a primary master signal when the steering wheel 115 is rotated, and G is the gain value applied by the gain module 435. Utilizing the gain signal equation, value of the modified secondary signals may be determined. When the ECU is utilized without the steering-assist system 165 as described herein, the gain G is 1. However, in the steering-assist system 165 the gain G is adjustable from about 1 to about 99.

In one example, such as using the primary master signal 315A above with the gain signal equation having values n=2.7, U=V and gain G=1 (using the ECU without the steering-assist system 165), the gain signal equation would yield a secondary signal of 2.7 V. However, using the primary master signal 315A above (n=2.7, U=V) and a gain G of 10, the gain signal equation would yield a secondary master signal of 4.5 V.

Figure 5:
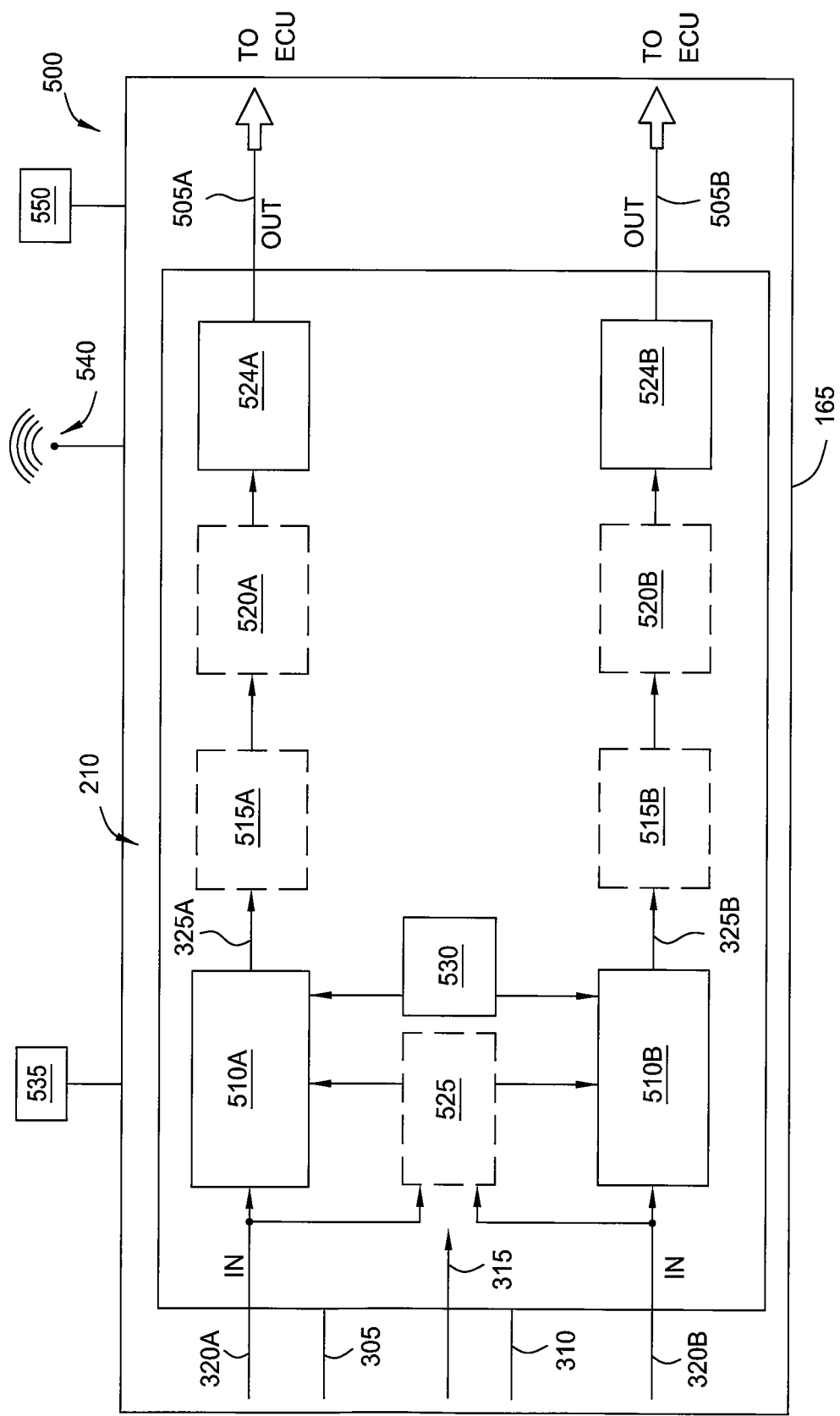
FIG. 5 is a schematic representation of a circuit showing another embodiment of the invention.

FIG. 5 is a schematic representation of a module 500 that may comprise the controller 210 of the steering-assist system 165. The controller 210 is powered via the first power signal 305 and second power signal 310 In one embodiment, the controller 210 processes the primary master signal 320A and/or the primary slave signal 320B to produce a modified secondary master signal 325A and/or a secondary slave signal 325B that is different than the primary master signal 320A and the primary slave signal 320B. In one embodiment, the module 500 modifies (i.e., amplifies, limits, and/or otherwise conditions) the primary master signal 320A and the primary slave signal 320B to provide a modified secondary master signal 505A and a modified secondary slave signal 505B, respectively, that are provided to the ECU.

The primary master signal 320A and the primary slave signal 320B are provided to a first signal conversion module 510A and a second signal conversion module 510B, respectively, which modify the primary master signal 320A and the primary slave signal 320B to the secondary master signal 325A and the secondary slave signal 325B, respectively. The signal conversion modules 510A, 510B may be similar to the signal conversion module 400 described in FIG. 4. The signal conversion modules 510A, 510B (or any portion thereof) may be implemented in hardware, firmware, or software, using any of various analog and/or digital devices suitable for signal processing, including operational amplifiers (op-amps), discrete components, microprocessors, digital signal processors (DSP's), application specific integrated circuits (ASIC's), programmable logic controllers, or the like.

The module 500 may also include one or more optional delay devices, such as a first delay module 515A and a second delay module 515B that delays the secondary master signal 325A and the secondary slave signal 325B, respectively. In one aspect, the delay is a logarithmic signal. The module 500 may also include one or more optional limiting circuits, such as a first limiting circuit 520A and a second limiting circuit 520B. The first limiting circuit 520A and the second limiting circuit 520B may clamp or otherwise condition the secondary master signal 325A and/or the secondary slave signal 325B to be within values recognized and acceptable to the ECU. In one aspect, the secondary master signal 325A, which may be modified to a value outside of the values recognized by the ECU, is provided to the first limiting circuit 520A. The first limiting circuit 520A may limit the secondary master signal 325A by modifying the signal to a value recognized by the ECU. While not described for brevity, the second limiting circuit 520B may condition the secondary slave signal 325B in a similar manner. In one specific example, the secondary master signal 325A provided to the first limiting circuit 520A may be 4.5 V, while the ECU is programmed to recognize voltages up to 3.8 V. In this example, the first limiting circuit 520A conditions the secondary master signal 325A to be within the 3.8 V limit. The module 500 may also include a first signal booster module 524A and a second signal booster module 524B. The signal booster modules 524A, 524B may be utilized to boost the current of the signals before the modified secondary master signal 505A and the modified secondary slave signal 505B are provided to the ECU.

Utilizing the steering-assist system 165 with the steering control module 160 of the ECU includes challenges that have been overcome by embodiments of the invention. Modification of the primary master signal 320A and the primary slave signal 320B may be detected as a fault(s) by the ECU, which may cause the ECU to shut down, rendering the vehicle inoperable. Further, portions of the ECU and other associated control networks in the vehicle may fail and/or detect faults causing the OEM steering assistance and/or the enhanced reduced effort steering assistance provided by the steering-assist system 165 to fail or not operate properly.

For example, some OEM ECU's include an auto-calibration circuit to compensate for errors in the signal(s) generated by the torque sensor 150 due to changes in ambient temperature or other external factors. Some vehicle manufacturers utilize a reference signal 315 that is sent to the torque sensor 150 to calibrate the signals to account for any errors from these external factors. The reference signal 315 may cause a modification in the output signals from the torque sensor 150. In conventional systems where the OEM ECU provides a reference signal 315, the module 500 may include a reference signal generator 525 that may be utilized to modify the reference signal 315 based on any modifications of the primary master signal 320A and the primary slave signal 320B. In one aspect, the reference generator 425 is used to provide a modified zero point (i.e., center value for the master/slave signals when there is no force acting on the steering wheel (primary signal 405A, for example, in FIG. 4)) based on the modification of the master/slave signals. However, in OEM systems where no reference signal is available via the ECU, the I reference signal generator 525 is used to provide a reference signal based on the modifications to the primary master signal 320A and the primary slave signal 320B.

Another of the issues encountered when modifying OEM EPS systems is the so-called "pendulum effect." Conventional EPS systems typically include a servo motor (i.e., motor 145 (FIG. 1)) that provides a steering assistance substantially directly proportional to the applied torque and direction applied to the steering wheel 115. This movement is detected by the ECU which is in electrical communication with the torque sensor 150, and depending on the magnitude of the applied torque and other factors, such as speed of the vehicle, the steering assistance is applied in the direction of turning (e.g., clockwise, counterclockwise) that corresponds with the force and velocity necessary to leave the torque sensor 150 in a neutral position. In other words, the object of the steering assistance is to maintain the torque sensor in a neutral point.

When using the steering-assist system 165, the controller 210 amplifies the signal(s) of the torque sensor 150. The controller 210 generates an amplified signal(s) which results in a greater magnitude of power to the steering control system 105 (FIG. 1). Thus, the controller 210 provides a greater steering assistance than was possible with the OEM ECU and the greater power provided by the controller 210 may reset the zero point of the master/slave signals. The reset may be detected by the ECU which then controls the directional motion of the servo motor to come back to a "new" zero point in the opposite direction. This repeats itself indefinitely causing a "pendulum effect."

To mitigate the potential pendulum effect when using the steering-assist system 165, the steering-assist system 165 includes a delay module, such as delay modules 515A, 515B, that produces a delay in the modified master signal (and slave signal). In one aspect, the delay module generates amplified signals along an exponential curve. In another aspect, the delay module serves to modify the amplified signal in accordance to the known parameters recognized by the ECU, thus eliminating the undesired "pendulum effect." Each of the delay modules 515A, 515B may comprise hardware, such as discrete components (e.g., diodes and/or capacitors), or may comprise a software program within a microprocessor or digital signal processor.

Another issue encountered in utilizing the steering-assist system 165 in conjunction with the ECU includes keeping the modified signals within limits recognized by the ECU. For example, the primary master signal 320A and the primary slave signal 320B generated by the torque sensor 150 are in a range that is limited in minimum and maximum values accepted by the ECU for safety reasons. The signal limitations pose a challenge when utilizing the steering-assist system 165.

For example, when the primary master signal 320A and the primary slave signal 320B are modified, the modified signals may be outside of the allowable range(s) recognized by the ECU, which may be recognized by the ECU as a critical fault, which may cause portions of the ECU to shut down and leave the vehicle without steering assistance. For physically challenged drivers, no steering assistance can be dangerous. The first limiting circuit 520A and the second limiting circuit 520B are utilized to provide signal values to the ECU that are within accepted ranges. The accepted ranges may differ from manufacturer to manufacturer but, as an example, the accepted ranges may be between about 1.2 V to 3.8 V. However, the accepted range is only exemplary and the values may differ from vehicle-to-vehicle and manufacturer-to-manufacturer.

Further, the signals from the torque sensor 150 (primary master and slave signals) may not be timed to correspond with timing acceptable by the ECU. For example, the primary master signal 320A and the primary slave signal 320B may be temporally separated, and the ECU regards this temporal separation as normal operation. However, the processing of the primary master signal 320A and the primary slave signal 320B when using the steering-assist system 165 may increase or decrease the temporal separation to a timing that the ECU recognizes as an error, which may cause the steering system to fail. In order to prevent this possible failure, the reference generator module 525 may be utilized to create a new reference signal or zero point using the primary master signal 320A and the primary slave signal 320B.

Referring again to FIG. 5, the steering-assist system 165 may be coupled to a display monitor 535 that is added to the vehicle to provide information relating to the steering-assist system 165 and/or the ECU, as well as other portions of the steering control system 105 to an operator of the vehicle. The display monitor 535 may be a liquid-crystal display (LCD) or other type of display screen typically used in televisions, cell phones and computer monitors. The display monitor 535 may also comprise and interactive module adapted as a user interface, such as a graphical user interface (GUI). Additionally, the steering-assist system 165 may include a communications network external to the vehicle communications system. For example, the steering assist system may include an integral communications system 540 that provides electronic access to the controller 210 for diagnostics and/or adjustment.

In one aspect, the steering-assist system 165 includes a communications system 540 which includes networking hardware and software that provide a wired or wireless communications link to external communications systems. In one aspect, the communications system 540 facilitates diagnostics and/or adjustment of the steering-assist system 165 wirelessly. For example, the gain module 430 (shown in FIG. 4) may be adjusted based on the needs of the driver wirelessly or via a wired connection to adjust the steering effort of the vehicle. The communications system 540 may transmit or receive data through the World Wide Web (WWW), internet, wide area network (WAN), local area network (LAN), or other wireless device or system, such as satellite links and/or cell phone networks. Thus, the communications system 540 may provide access to the steering-assist system 165 at any time when the vehicle is within wireless range of a device or network. The steering-assist system 165 may also include a memory 550, which may be an EEPROM type, to store data related to the operation of the steering-assist system 165 and/or the ECU. The communications system 540 may be utilized for diagnostics, adjustment of effort parameters (i.e., set amplification values), monitor of memory, monitoring of an hour meter, as well as other critical information associated with the steering-assist system 165 and/or the ECU.

Figure 6:
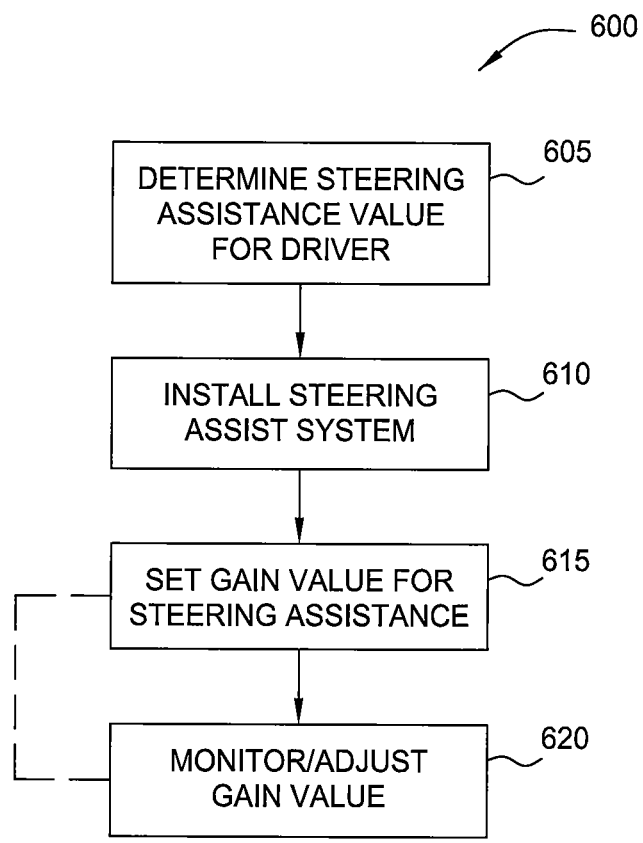
FIG. 6 is a flowchart showing one embodiment of a steering-assist modification method.

FIG. 6 is a flowchart showing one embodiment of a steering-assist modification method 600. The method 600 may be utilized to customize a steering assistance based on the needs of the driver of a vehicle. The method 600 includes process 605, which comprises determining a steering assistance value for a particular driver. Process 605 may include providing a vehicle having a steering-assist system 165 as described herein and allowing the driver to manipulate the steering wheel of the vehicle. The process 605 may include the supervision of a physical therapist or other suitable healthcare professional to assist in determining the proper steering assistance value for the driver. The process 605 may also include manipulation of the gain module 530 (FIG. 5) to adjust the torque value required to rotate the steering wheel. The process 605 may also include allowing the driver to test drive the vehicle to determine the proper torque value and the steering assistance needed by the driver.

The method 600 may also comprises process 610, which includes installing the steering-assist system 165 onto a vehicle that is to be used by the driver after process 605. In one embodiment of the method 600, the steering-assist system 165 is pre-installed on the vehicle for execution of the process 605. In another embodiment, the vehicle utilized in process 605 is a first vehicle having the steering-assist system 165 installed thereon for testing, and the vehicle utilized in process 610 is a second vehicle that the driver may use as a personal vehicle in day-to-day driving. Thus, in one embodiment, the process 610 may be performed prior to the process 605.

Process 610 includes the installation of the steering-assist system 165 as described herein. The installation may be before, during or after process 605. In one aspect, process 610 is completed or near completion during the process 605. In one embodiment, when the process 605 is complete utilizing the first vehicle, the physical therapist or driver may communicate the steering assistance value to the installer performing the process 610 on the second vehicle. Process 615 includes setting the gain of the steering-assist system 165 on the second vehicle based on the steering assistance value. The gain may be adjusted, set and stored in the controller, and the second vehicle is readied for delivery to the driver. Process 620 includes monitoring and/or adjusting the gain value of the steering-assist system 165. The monitoring may be performed manually or wirelessly. Adjustments may need to be made based on external factors, such as ambient temperature where the vehicle is operating and/or adjustments may be made based on a change in physical strength of the driver. Similar to the monitoring, the adjustments may be made via a wired connection or wirelessly. One or both of the monitoring and the adjusting may occur in real-time.

Due to the variety of OEM electronic steering systems, numerous modifications and variations of the present invention are possible and necessary in light of the above teachings. It is therefore to be understood that within the scope of the appended claims, the invention may be practiced otherwise than as specifically described herein.

The invention claimed is:

1. A method for installing a steering-assist system onto a vehicle having an electrically powered steering system, the method comprising:
    placing a controller between a torque sensor and an electronic control unit (ECU) disposed on the vehicle;
    coupling a primary signal line from the torque sensor to be in electrical communication with the controller; and
    coupling a secondary signal line to the controller to be in electrical communication with the ECU, wherein, when movement is detected by the torque sensor, the torque sensor provides a primary signal to the controller and the controller provides a secondary signal to the ECU, the secondary signal being different than the primary signal, wherein the secondary signal comprises a first signal that is amplified to a second signal having a value greater than the primary signal, and wherein the second signal is limited by a limiting circuit to a third signal having a value less than the value of the second signal but greater than the value of the primary signal.

2. The method of claim 1, wherein the secondary signal differs from the primary signal by a factor of 2 to 10, or greater.

3. The method of claim 1, wherein the primary signal comprises a master signal.

4. The method of claim 3, wherein the primary signal further comprises a slave signal that is inversely related to the master signal.

5. The method of claim 3, wherein the master signal comprises a primary master signal and the secondary signal comprises a secondary master signal.

6. The method of claim 5, wherein the secondary master signal is greater than the primary master signal by a factor of 3 to 8.

7. A method for installing a steering-assist system onto a vehicle having an electrically powered steering system, the method comprising:
    placing a controller intermediate of a torque sensor and an electronic control unit (ECU) disposed on the vehicle;
    coupling a first primary signal line and a second primary signal line from the torque sensor to be in electrical communication with the controller; and
    coupling a first secondary signal line and a second secondary signal line to the controller to be in electrical communication with the ECU, wherein, when movement is detected by the torque sensor, the torque sensor provides a primary signal from the first primary signal line and the second primary signal line to the controller and the controller provides a secondary signal to the ECU through the first secondary signal line and the second secondary signal line, the first secondary signal being different than the first primary signal, wherein the first secondary signal comprises a first signal that is amplified to a second signal having a value greater than the primary signal, and wherein the second signal is limited by a limiting circuit to a third signal having a value less than the value of the second signal but greater than the value of the primary signal.

8. The method of claim 7, wherein the first secondary signal differs from the first primary signal by a factor of 2 to 10, or greater.

9. The method of claim 7, wherein the controller comprises an amplification circuit to amplify the primary signal.

10. The method of claim 7, wherein the controller comprises one or more limiting circuits to limit the first secondary signal within a prescribed range accepted by the ECU.

11. The method of claim 7, wherein the controller comprises a delay circuit.

12. The method of claim 7, wherein the controller is coupled to a communications system.

13. A steering-assist system for use in a vehicle having an electrically powered steering system, the steering-assist system comprising:
   a controller adapted to be coupled intermediate of a torque sensor and an electronic control unit (ECU) disposed on a vehicle;
   a first primary signal line and a second primary signal line adapted to be coupled between the torque sensor and the controller; and
   a first secondary signal line and a second secondary signal line adapted to be coupled to the controller and the ECU, wherein, a primary signal from the first primary signal line and the second primary signal line is provided to the controller from the torque sensor and a secondary signal is provided to the ECU from the first secondary signal line and the second secondary signal line from the controller upon movement detected by the torque sensor, the first secondary signal being different than the first primary signal, wherein the first secondary signal comprises a first signal that is amplified to a second signal having a value greater than the primary signal, and wherein the second signal is limited by a limiting circuit to a third signal having a value less than -the value of the second signal but greater than the value of the primary signal.

14. The system of claim 13, wherein the first secondary signal differs from the first primary signal by a factor of 2 to 99.

15. The system of claim 14, further comprising a communications system coupled to the controller.

16. The system of claim 15, wherein the communications system comprises a wireless system.

17. The system of claim 14, further comprising:
   a monitor coupled to the controller for displaying information related to the controller.

18. The system of claim 17, wherein the monitor is a graphical user interface.

* * * * *